O. C. KOCH.
SPRING WHEEL.
APPLICATION FILED NOV. 27, 1914.
1,164,529.
Patented Dec. 14, 1915.
2 SHEETS—SHEET 2
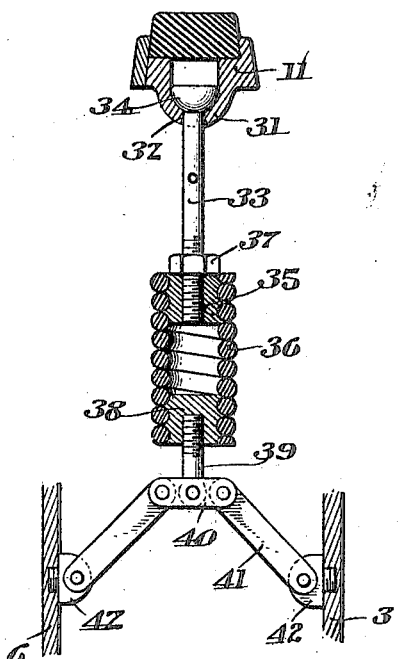
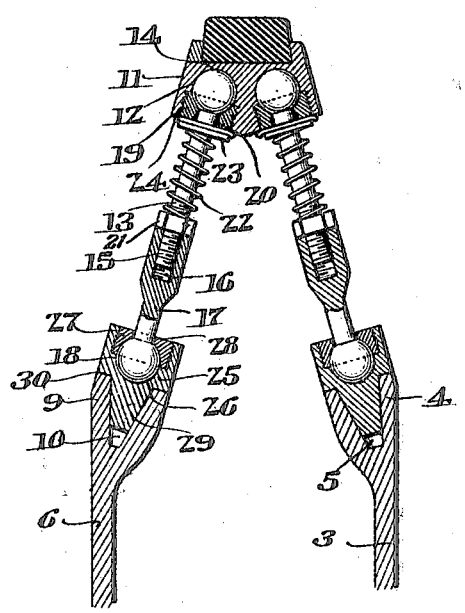
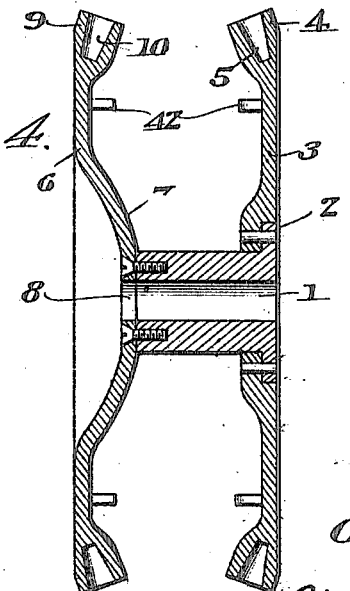
Witnesses
A. V. Doyle
H. E. Laughlin
Inventor
Otto C. Koch
By Victor J. Evans
Attorney

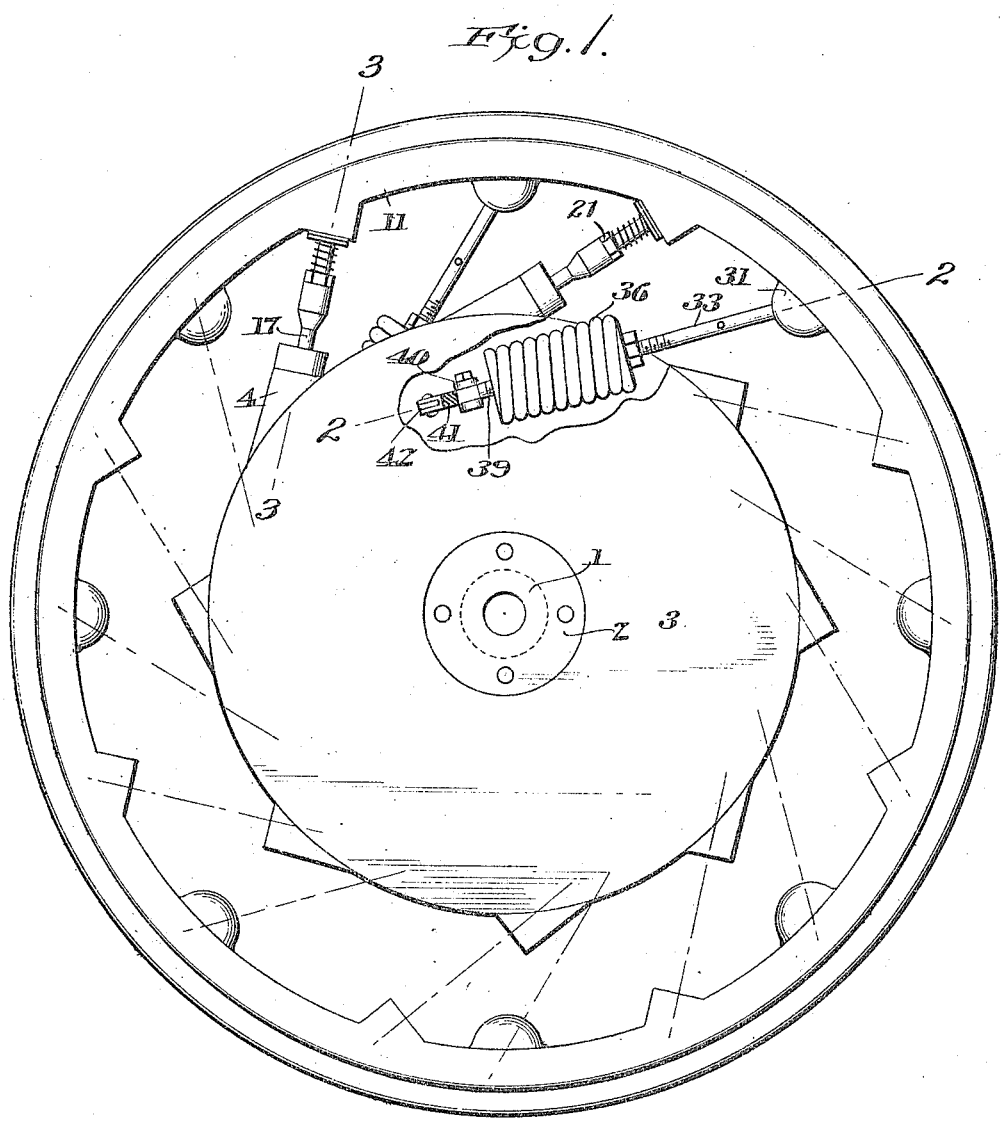

UNITED STATES PATENT OFFICE.

OTTO C. KOCH, OF BAYONNE, NEW JERSEY.

SPRING-WHEEL.

1,164,529.  Specification of Letters Patent.  Patented Dec. 14, 1915.

Application filed November 27, 1914. Serial No. 874,241.

*To all whom it may concern:*

Be it known that I, OTTO C. KOCH, a citizen of the United States, residing at Bayonne, in the county of Hudson and State of New Jersey, have invented new and useful Improvements in Spring-Wheels, of which the following is a specification.

This invention relates to spring wheels and it consists in the novel features hereinafter described and claimed.

An object of the invention is to provide a wheel of such structure that the hub thereof may have slight movement with relation to the rim thereof the said hub and the rim being connected together by resilient means tending to hold the said parts in normal position with relation to each other.

The parts of the wheel are so arranged that when weight or a turning movement is applied to the hub the said movement is transmitted to the rim through the connecting parts by a pulling action through the said resilient means which connect the hub with the rim. Spokes of especial design and arrangement are connected with the hub and the rim and are tangentially disposed with relation to the hub and are arranged in pairs the members of which are located at the opposite sides of the central vertical plane of the wheel and are inclined at their outer ends from the said central plane of the wheel toward the ends of the hub whereby the weight or strain sustained by the spokes is transmitted from the wheel rim to the hub in directions tangential with relation to the hub and at the opposite ends thereof.

In the accompanying drawing:—Figure 1 is a side elevation of the wheel with parts broken away. Fig. 2 is a transverse sectional view of portions of the same cut on the line 2—2 of Fig. 1. Fig. 3 is a transverse sectional view of portions of the same cut on the line 3—3 of Fig. 1, Fig. 4 is a transverse sectional view of the hub of the wheel.

The hub of the wheel comprises a sleeve 1 provided at one end with a flange 2 to which is bolted or otherwise suitably secured a plate 3. The plate 3 is provided at its periphery and at spaced intervals with projections 4 which in turn are provided with cone-shaped pockets 5.

A plate 6 is secured to the outer end of the sleeve 1 and the said plate at its central portion is concaved as at 7 the said concaved portion being connected with the said sleeve in any suitable manner or as shown in Fig. 4 of the drawing. The concaved portion 7 of the plate 6 is provided with an opening 8 which registers with the opening in the sleeve 1 and the said openings are adapted to receive an axle upon which the wheel is mounted and the axle nut may be housed or positioned in the concaved portion 7 thus preventing the said nut from projecting beyond the side of the wheel and presenting obstruction. The plate 6 is provided at its periphery with projections 9 similar to the projections 4 and which correspond in number with the projections 4. The projections 9 are provided with cone-shaped pockets 10. The longitudinal dimensions or axes of the pockets 5 and 10 converge toward each other as best indicated in Figs. 3 and 4 of the drawing.

The wheel rim 11 is provided at intervals with sockets 12 which are arranged in pairs as best indicated in Fig. 3 of the drawing and the members of the pairs of sockets 12 being located at the opposite sides of the vertical center of the rim 11. Spokes are provided for connecting the hub structure hereinbefore described with the rim and as the spokes are of the same arrangement a description of one will suffice.

Each spoke comprises a rod 13 provided at one end with a ball 14 and at its opposite end with a thread 15. The thread 15 is screwed into engagement with a socket 16 provided in a member 17 and the said member 17 is provided at its inner end with a ball 18. A nut 19 is mounted upon the rod 13 and bears against the inner side of the ball 14 the said nut having an opening 20 through which the rod 13 passes, the said opening being somewhat larger in diameter than the diameter of the rod whereby the rod may have slight movement with relation to the nut 19. A lock nut 21 is screw threaded upon the rod 13 and engages the thread 15 thereof. One side of the lock nut 21 bears against the end of the member 17 as best shown in Fig. 3 of the drawing. A coil spring 22 surrounds the rod 13 and bears at one end against the nut 21.

A washer 23 is slidably mounted upon the end portion of the rod 13 and the outer end of the spring 22 bears against the said washer. A packing washer 24 of soft material is interposed between the washer 23 at the inner side of the nut 19 and the spring 22 serves to hold the washer 24 in close contact with the side of the nut 19 thereby closing the inner end of the opening 20 and preventing dust or dirt from entering the same.

Cup members 25 are provided with sockets 26 and each cup member 25 receives a ball 18. The nut 27 is screw threaded in the outer end of the cup member 25 and is provided with an opening 28 through which member 17 passes. The diameter of the opening 28 is somewhat larger than the diameter of the member 17 whereby the said member 17 may have slight movement with relation to the nut 27. The cup member 25 is provided with a conical shank 29 and at the outer end of the shank the said cup member 25 is provided with an outstanding annular shoulder 30.

As shown in Fig. 3 of the drawing the shank 29 of the cup members 25 are snugly received in the passages 5 and 10 of the projections 4 and 9 of the plates 3 and 6, and the shoulders 30 of the cup members 25 normally bear against the ends of the projections 4 and 9. The balls 14 upon the rods 13 are received in the sockets 12 of the rim 11 and are held therein by the nuts 19 which have screw thread engagement with the walls of the said sockets. As shown in Fig. 3 the spokes are arranged in pairs and the members of each pair are positioned at the opposite sides of the vertical plane of the wheel. The outer ends of the said spokes converge toward each other and the inner ends thereof diverge toward the hub of the wheel. As indicated in Fig. 1 of the drawing the spokes are tangentially disposed with relation to the hub of the wheel; consequently when the spokes are subjected to thrust strain the said strain is transmitted to the hub at the opposite ends thereof and the strain is transmitted through the spokes to the hub in a direction tangentially of the hub and inasmuch as the outer ends of the spokes are connected with the rim of the wheel any turning movement applied to the hub will have a tendency to act as a pull through the spokes upon the rim of the wheel. Also the spokes at the lower portion of the wheel which transmit the weight sustained by the hub most directly from the hub to the rim are disposed tangentially with relation to the hub and consequently these spokes will have a tendency to accelerate the turning movement of the hub in a forward direction.

If at any time it should happen that the hub is turned at a greater or faster rate of speed than the rim the shanks 29 of the cups 25 will move longitudinally in the pockets 5 and 10 and permit of the said variation in movement between the hub and rim. However means is provided and will be explained hereinafter for returning the shanks 29 to their proper positions in the pockets 5 and 10. Pockets 31 are provided at intervals along the inner side of the rim 11 and the said pockets are provided with openings 32. Rods 33 pass through the openings 32 and inasmuch as the diameter of the rods 33 is less than the diameter of the openings 32 the said rods may have slight movement with relation to the pockets 31. Hemi-spherical heads 34 are mounted at the outer ends of the rods 33 and are movably mounted in the pockets 31. The inner ends of the rods 33 are screw threaded in blocks 35 which in turn are received in and secured by the outermost convolutions of springs 36. Lock nuts 37 are screw threaded upon the rods 33 and bear against the outer ends of the blocks 35 and serve as means for holding the rods 33 in adjusted positions with relation to the said blocks. Blocks 38 are secured in any suitable manner in the inner end portions of the springs 36 and studs 39 are carried by the blocks 38. The inner ends of the studs 39 are pivotally connected with plates 40 and links 41 are pivotally connected at one end with the ends of the said plates 40. The inner ends of the links 41 are pivotally connected with studs 42 which are mounted upon the plates 3 and 6 as best indicated in Figs. 2 and 4 of the drawing.

The springs 36 are under tension with a tendency to hold the rim 11 toward the hub of the wheel of which the plates 3 and 6 are component parts. Consequently when the hub of the wheel is rotated a pulling strain is exerted through the springs 36 and the parts connected therewith from the hub of the wheel to the rim thereof. In the event that the hub should rotate faster than the rim or turn faster than the rim as hereinbefore indicated the springs 36 elongate whereby the shanks 29 may have the movement in the pockets 5 and 10 hereinbefore described but as soon as the wheel is subjected to normal conditions wherein the hub and the rim turn or rotate at a uniform rate of speed the springs 36 contract whereby the rim 11 is drawn to its normal position with relation to the hub and the shanks 29 are forced back into their normal positions in the pockets 5 and 10 and the shoulders 30 of the cup members 25 are caused to seat against the outer ends of the projections 4 and 9.

From the above description taken in conjunction with the accompanying drawing it will be observed that a wheel of simple and durable structure is provided and that the said wheel possesses a certain amount of spring or resiliency whereby the wheel is caused to move in an even and regular manner over surfaces of the road and also the strains are transmitted from the hub of the wheel to the rim and vice versa in such manner as to facilitate the rotary movement of the wheel.

Having described the invention what is claimed is:—

A wheel comprising a hub and a rim, spokes interposed between the hub and the rim, the spokes being held in contact with one of the said parts against longitudinal movement and slidably engaging the other of the said parts for longitudinal movement, the spokes being tangentially disposed with relation to the hub, the spokes being arranged in pairs the members of the pairs of spokes being connected at the opposite ends of the hub and spring traction means interposed between the hub and the rim.

In testimony whereof I affix my signature in presence of two witnesses.

OTTO C. KOCH.

Witnesses:
STEPHEN M. JETAS,
HORACE K. ROBERSON.